US009687039B2

(12) United States Patent
Koyess et al.

(10) Patent No.: US 9,687,039 B2
(45) Date of Patent: Jun. 27, 2017

(54) GRAPHICAL ELEMENT LAMINATE FOR USE IN FORMING A SKATE BOOT

(71) Applicant: Sport Maska Inc., Montreal (CA)

(72) Inventors: Philippe Koyess, Orford (CA); David Dekoos, Montreal (CA)

(73) Assignee: SPORT MASKA INC., Montreal (CA)

( * ) Notice: Subject to any disclaimer, the term of this patent is extended or adjusted under 35 U.S.C. 154(b) by 0 days.

(21) Appl. No.: 14/884,843

(22) Filed: Oct. 16, 2015

(65) Prior Publication Data
US 2016/0029737 A1    Feb. 4, 2016

Related U.S. Application Data

(60) Continuation of application No. 14/023,037, filed on Sep. 10, 2013, now Pat. No. 9,192,207, which is a
(Continued)

(51) Int. Cl.
*A43B 23/24* (2006.01)
*A43B 5/16* (2006.01)
(Continued)

(52) U.S. Cl.
CPC .......... *A43B 5/1666* (2013.01); *A43B 1/0027* (2013.01); *A43B 1/0072* (2013.01); *A43B 1/04* (2013.01); *A43B 3/0078* (2013.01); *A43B 5/16* (2013.01); *A43B 5/1625* (2013.01); *A43B 23/0225* (2013.01); *A43B 23/0235* (2013.01); *A43B 23/24* (2013.01); *A43D 8/16* (2013.01);
(Continued)

(58) Field of Classification Search
CPC .......... A43B 5/16; A43B 5/166; A43B 23/00; A43B 23/0235; A43B 23/024; A43B 23/026; A43B 23/24; A43B 3/0078; A43B 3/00786

USPC .................................... 36/45, 136, 112, 115
See application file for complete search history.

(56) References Cited

U.S. PATENT DOCUMENTS 2,982,033 A   5/1961   Bingham, Jr.
3,319,360 A   5/1967   Nadler
(Continued)

FOREIGN PATENT DOCUMENTS

DE   1809167   7/1969
EP   1527706   5/2005
FR   2847433   5/2004

OTHER PUBLICATIONS

European Search Report from EP 10 00 4895 dated Aug. 27, 2010; Munich; Diego Tejada Biarge.

*Primary Examiner* — Marie Bays
(74) *Attorney, Agent, or Firm* — Norton Rose Fulbright Canada

(57) ABSTRACT

A graphical element laminate for use in forming a skate boot, including a base layer, a first thermoplastic layer laminated on an outer side of the base layer, a second thermoplastic layer laminated on an outer side of the first thermoplastic layer, and a graphical element printed on at least one portion of at least one of the first thermoplastic layer outer side and the second thermoplastic layer inner side. At least a portion of the second thermoplastic layer is transparent and/or translucent such that when the laminate forms part of the skate boot at least a portion of the graphical element is visible through the second thermoplastic layer from an exterior of the skate boot.

20 Claims, 6 Drawing Sheets

Related U.S. Application Data division of application No. 12/774,767, filed on May 6, 2010, now Pat. No. 8,555,527.

(60) Provisional application No. 61/177,621, filed on May 12, 2009.

(51) Int. Cl.
| | |
|---|---|
| *A43D 8/22* | (2006.01) |
| *A43B 1/00* | (2006.01) |
| *A43B 1/04* | (2006.01) |
| *A43B 3/00* | (2006.01) |
| *A43B 23/02* | (2006.01) |
| *A43D 8/16* | (2006.01) |
| *B32B 27/12* | (2006.01) |
| *B44C 1/00* | (2006.01) |
| *A43D 111/00* | (2006.01) |
| *B32B 5/02* | (2006.01) |
| *B32B 27/08* | (2006.01) |
| *B32B 27/10* | (2006.01) |
| *B32B 27/40* | (2006.01) |

(52) U.S. Cl.
CPC ............ *A43D 8/22* (2013.01); *A43D 111/00* (2013.01); *B32B 5/024* (2013.01); *B32B 27/08* (2013.01); *B32B 27/10* (2013.01); *B32B 27/12* (2013.01); *B32B 27/40* (2013.01); *B44C 1/00* (2013.01); *B32B 2262/0276* (2013.01); *B32B 2262/06* (2013.01); *B32B 2262/08* (2013.01); *B32B 2262/101* (2013.01); *B32B 2262/106* (2013.01); *B32B 2270/00* (2013.01); *B32B 2307/4023* (2013.01); *B32B 2307/412* (2013.01); *B32B 2307/414* (2013.01); *B32B 2307/554* (2013.01); *B32B 2307/558* (2013.01); *B32B 2307/75* (2013.01); *B32B 2437/02* (2013.01); *B32B 2451/00* (2013.01); *Y10T 428/2481* (2015.01); *Y10T 428/24884* (2015.01)

(56) References Cited

U.S. PATENT DOCUMENTS

| | | | |
|---|---|---|---|
| 3,568,339 | A | 3/1971 | Hara |
| 3,921,313 | A | 11/1975 | Mahide et al. |
| 6,775,932 | B2 | 8/2004 | Lin |
| 7,877,905 | B2 | 2/2011 | Bensing et al. |
| 8,001,705 | B2 | 8/2011 | Cagliari |
| 8,555,527 | B2 | 10/2013 | Koyess et al. |
| 2004/0103562 | A1 | 6/2004 | Chaigne |
| 2004/0172855 | A1* | 9/2004 | Aslanides ............ A43B 1/0027 36/136 |
| 2005/0198871 | A1* | 9/2005 | Cagliari ............... A43B 1/0072 36/117.1 |
| 2005/0223602 | A1 | 10/2005 | Cagliari |
| 2007/0101619 | A1* | 5/2007 | Bensing ............... A43B 1/0063 36/136 |
| 2008/0248261 | A1 | 10/2008 | Bonnett et al. |
| 2009/0019731 | A1 | 1/2009 | Braynock et al. |
| 2010/0003472 | A1* | 1/2010 | Lien .................... A43B 1/0036 428/195.1 |
| 2013/0031803 | A1 | 2/2013 | Koch et al. |
| 2014/0202041 | A1 | 7/2014 | Kupferberg |
| 2014/0237737 | A1 | 8/2014 | Regan et al. |
| 2014/0250734 | A1 | 9/2014 | Zheng |
| 2014/0310892 | A1 | 10/2014 | Miller |

\* cited by examiner

GRAPHICAL ELEMENT LAMINATE FOR USE IN FORMING A SKATE BOOT

CROSS-REFERENCE

The present application is a continuation of U.S. application Ser. No. 14/023,037, filed on Sep. 10, 2013, which is a divisional of U.S. application Ser. No. 12/774,767, filed on May 6, 2010, which claims priority to U.S. Provisional Application No. 61/177,621, filed May 12, 2009, the entirety of both which is incorporated herein by reference.

FIELD OF THE INVENTION

The present invention relates to a graphical element laminate for use in forming a skate boot, and a skate boot incorporating the graphical element laminate.

BACKGROUND OF THE INVENTION

Many people enjoy skating as a recreational pastime, either with ice skates or with roller skates such as in-line roller skates. This pastime is generally made more enjoyable by providing skate boots having a distinctive and attractive appearance. In addition, manufacturers of skates have a desire to produce skate boots having a distinctive and attractive experience as they compete with other manufacturers for retail sales. As a result, skate boots are available having a wide variety of exterior colors and patterns.

The variety of colors and patterns on conventional skate boots presents a number of difficulties in the manufacturing process. One common method of producing an aesthetically pleasing skate boot is to arrange decorative pieces of leather, fabric or plastic (as the case may be) having different colors on the outwardly-facing surface of the skate boot. While this method is generally effective, it requires a potentially large number of irregularly-shaped pieces of different materials to be joined together in proper alignment with one another. This process is labour-intensive, and requires the person assembling the pieces of material to become familiar with different patterns when working on different models of skate, or as styles evolve over time. As a result, the time and cost required to manufacture a skate boot may be increased, and there may in some cases be a disincentive to create new or complex skate boot designs. In addition, the numerous seams or other joints between the pieces of material may be prone to fraying or loosening over time.

Another method of producing an aesthetically pleasing skate boot is to fashion the outer layer of the skate boot out of a plastic material, such as thermoplastic polyurethane (TPU). This allows the option of providing the appearance of different textures in different areas of the skate boot. However, this method presents difficulty in applying different colors to different areas of the skate boot. One approach is to print a design on the outside of the plastic, but this printing, particularly on the quarter, may be prone to cracking, chipping or other damage during use of the skate, resulting in an unattractive appearance. In addition, plastic is considered by some users to be less attractive than fabric, particularly a woven composite fabric. Finally, this method may also in some cases provide a disincentive to create new skate boot designs, because even a small change in design might require a new and costly mold.

Some skates are used in competitive activities, such as hockey. The aforementioned inconveniences are particularly exacerbated when the skates are used in such activities, as these activities subject the skate boots to an increased frequency of impact and abrasion, from, for example, hockey sticks and pucks and/or the blades or boots of other skaters. While current skate boots are generally of sufficient quality to maintain their structural integrity and usefulness under these conditions, these impacts and abrasions may adversely affect the aesthetic appeal of the skate boots. Plastic outer surfaces and the colors applied thereon may be prone to cracking, denting and chipping, and fabric or leather outer surfaces or the seams/joints between them may become scratched, frayed or loosened, all of which reduces the aesthetic appeal of the skate boots.

At least for these reasons, improvements in the art of skate boots would be desirable.

SUMMARY OF THE INVENTION

It is an object of the present invention to ameliorate at least some of the inconveniences present in the prior art.

It is also an object of the present invention to provide a skate boot having a plastic outer layer and a composite inner layer, the plastic outer layer having at least one printed region and at least one transparent or translucent region through which the composite material can be seen.

It is also an object of the present invention to provide a method of manufacturing a skate boot having a plastic outer layer and a composite inner layer, the plastic outer layer having at least one printed region and at least one transparent or translucent region through which the composite material can be seen.

It is also an object of the present invention to provide a graphical element for a skate boot wherein the appearance of woven or non-woven fabric is interspersed with the appearance of printed elements.

It is also an object of the present invention to provide a method of manufacturing a skate boot wherein the appearance of woven or non-woven fabric is interspersed with the appearance of printed elements.

Thus, in one aspect, the invention provides a graphical element laminate for use in forming a skate boot, the laminate comprising: a base layer having a base layer inner side and a base layer outer side opposite the base layer inner side; a first thermoplastic layer laminated on the base layer outer side of the base layer, the first thermoplastic layer having a first thermoplastic layer inner side and a first thermoplastic layer outer side opposite the first thermoplastic layer inner side; a graphical element printed on at least one portion of the first thermoplastic layer inner side of the first thermoplastic layer, at least a portion of the first thermoplastic layer overlying the graphical element being at least one of transparent and translucent such that when the laminate forms part of the skate boot, at least a portion of the graphical element is visible through the first thermoplastic layer from an exterior of the skate boot. The graphical element may be opaque, translucent or transparent, or any combination thereof.

Preferably, the base layer outer side of the base layer includes a design element, and at least a portion of the first thermoplastic layer overlying the design element is at least one of transparent and translucent such that when the laminate forms part of the skate boot, at least a portion of the design element is visible through the first thermoplastic layer from the exterior of the skate boot. The design element may be any nature of visible characteristic of the base layer, including one or more of texture, shape, color or applied image.

Preferably, the first thermoplastic layer comprises at least one of a thermoplastic ionomer resin and polyurethane; the base layer comprises at least one of polyester, glass fiber, and carbon fiber. Optionally, the base layer may include a woven material and the design element is a weave of the material.

In another aspect, the invention provides a graphical element laminate for use in forming a skate boot, the laminate comprising: a base layer having a base layer inner side and a base layer outer side opposite the base layer inner side; a first thermoplastic layer laminated on the base layer outer side of the base layer, the first thermoplastic layer having a first thermoplastic layer inner side and a first thermoplastic layer outer side opposite the first thermoplastic layer inner side; a second thermoplastic layer laminated on the first thermoplastic outer side of the first thermoplastic layer, the second thermoplastic layer having a second thermoplastic layer inner side and a second thermoplastic layer outer side opposite the second thermoplastic layer inner side; a graphical element printed on at least one portion of at least one of the first thermoplastic layer outer side of the first thermoplastic layer and the second thermoplastic layer inner side of the second thermoplastic layer, at least a portion of the second thermoplastic layer being at least one of transparent and translucent such that when the laminate forms part of the skate boot at least a portion of the graphical element is visible through the second thermoplastic layer from an exterior of the skate boot.

Preferably, the base layer outer side of the base layer includes a design element, and at least portions of the first thermoplastic layer and the second thermoplastic layer of portions thereof overlying the design element of the base layer are at least one of transparent and translucent such that when the laminate forms part of the skate boot at least a portion of the design element is visible through the first thermoplastic layer and the second thermoplastic layer from an exterior of the skate boot.

Preferably, the first thermoplastic layer and the second thermoplastic layer each comprise at least one of a thermoplastic ionomer resin and polyurethane; the base layer comprises at least one of polyester, glass fiber, and carbon fiber. Optionally, the base layer may include a woven material and the design element is a weave of the material.

In yet another aspect, the invention provides a skate boot including a graphical element laminate as described hereinabove.

In yet another aspect, the invention provides a method of manufacturing a skate boot, comprising: providing a first sheet of thermoplastic material, the first sheet having a first side and an opposing second side, the thermoplastic material being at least one of translucent and transparent; printing a graphic element on the first side of the first sheet of thermoplastic material; providing a second sheet of base layer material, the second sheet having a first side and an opposing second side, the first side of the second sheet of base layer material having a design element; positioning the first side of the first sheet onto the first side of the second sheet such that the graphic image is disposed between the first side of the first sheet and the first side of the second sheet; joining the first sheet and the second sheet together to form a graphic element laminate; and affixing the second side of the second sheet to an outer surface of a skate boot core.

In yet another aspect, the invention provides a method of manufacturing a skate boot, comprising: providing a first sheet of a first thermoplastic material, the first sheet having a first side and an opposing second side, the first thermoplastic material being at least one of translucent and transparent; printing a graphic element on the first side of the first sheet of thermoplastic material; providing a second sheet of a second thermoplastic material, the second sheet having a first side and an opposing second side, the second thermoplastic material being at least one of translucent and transparent; positioning the first side of the first sheet onto the first side of the second sheet such that the graphic image is disposed between the first side of the first sheet and the first side of the second sheet; joining the first sheet and the second sheet together; providing a third sheet of base layer material, the third sheet having a first side and an opposing second side, the first side of the third sheet of base layer material having a design element; positioning the second side of the first sheet onto the first side of the third sheet such that the design element is disposed between the second side of the first sheet and the first side of the third sheet; joining the first sheet and the third sheet together to form a graphic element laminate; and affixing the second side of the third sheet to an outer surface of a skate boot core.

In yet another aspect, the invention provides a method of manufacturing a skate boot, comprising: providing a first sheet of a first thermoplastic material, the first sheet having a first side and an opposing second side, the first thermoplastic material being at least one of translucent and transparent; providing a third sheet of base layer material, the third sheet having a first side and an opposing second side, the first side of the third sheet of base layer material having a design element; positioning the second side of the first sheet onto the first side of the third sheet such that the design element is disposed between the second side of the first sheet and the first side of the third sheet; joining the first sheet and the third sheet together to form a graphic element laminate; printing a graphic element on the first side of the first sheet of thermoplastic material; providing a second sheet of a second thermoplastic material, the second sheet having a first side and an opposing second side, the second thermoplastic material being at least one of translucent and transparent; positioning the first side of the first sheet onto the first side of the second sheet such that the graphic image is disposed between the first side of the first sheet and the first side of the second sheet; joining the first sheet and the second sheet together; and affixing the second side of the third sheet to an outer surface of a skate boot core.

For purposes of this application, the terms "inner" and "outer", in reference to a layer of a graphic element laminate of the present invention, refer to the orientation of a side of the layer with respect to the side facing the interior or the exterior of a skate boot into which the graphic element laminate is incorporated.

For purposes of this application, the term "quarter", in reference to a skate or skate boot, refers either individually or collectively to the left or right portions of the boot upper, and should be understood to include, but is not limited to, an integral piece or package of material that forms both the left and right upper portions of the assembled boot.

For purposes of this application, the term "printing" refers to any method of printing, applying or transferring an image onto a target surface, including digital printing such as ink jet or laser printing, gravure printing, flexography, lithography, and silk screening.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
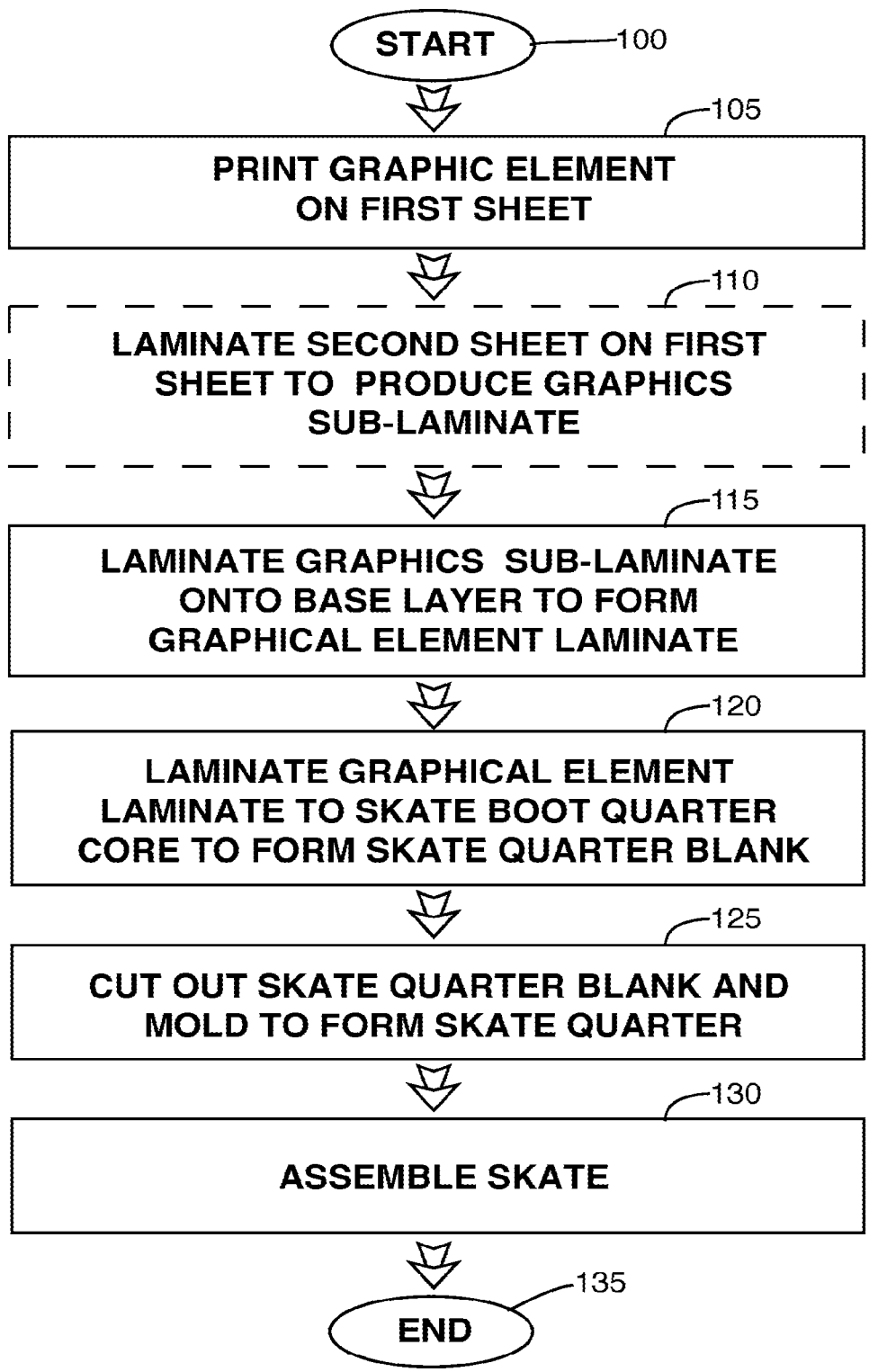
FIG. 1 is a logic diagram showing a method of manufacturing a skate according to a first embodiment.
Figure 4:
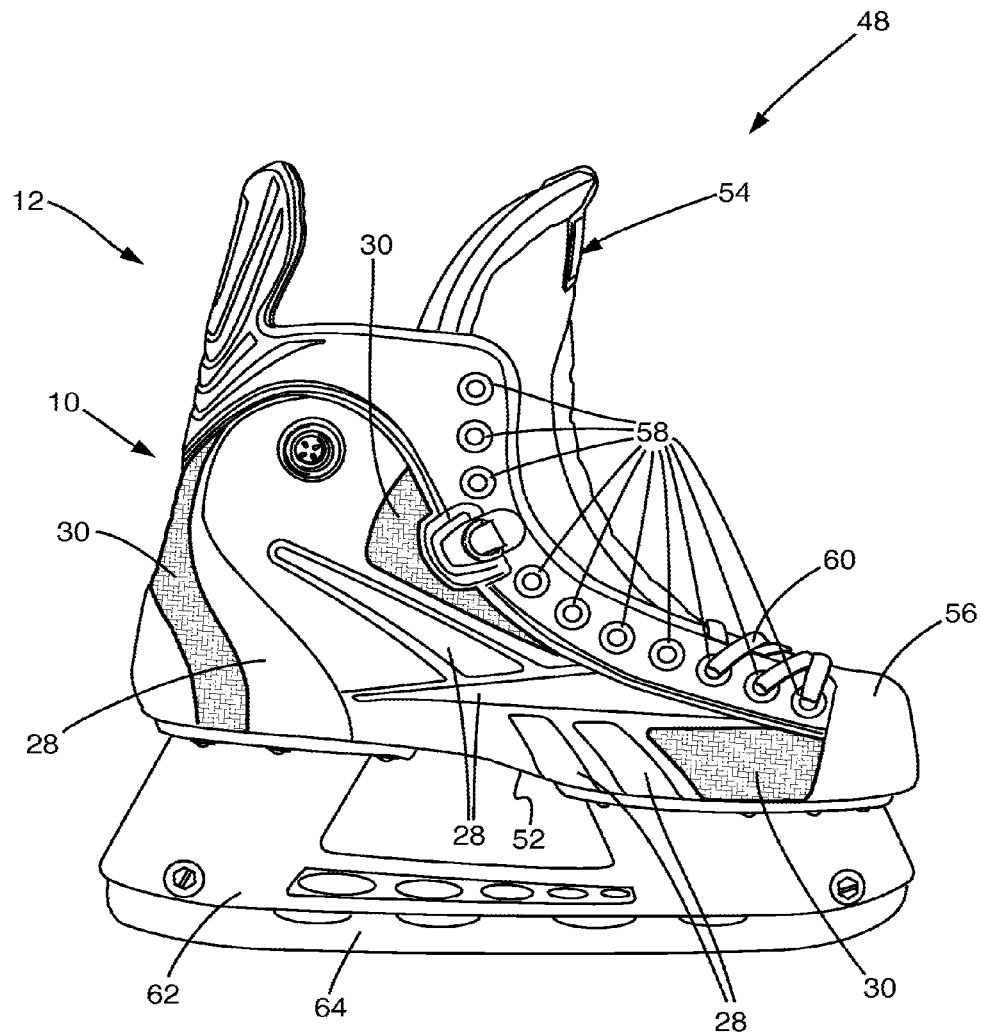
FIG. 4 is a right side elevation view of an ice skate manufactured according to an embodiment of the invention.

In the present application, referring to FIGS. 1 and 5, a method of assembly of a quarter 10 for a skate boot 12 (such as a skate boot 12 as shown in FIG. 4) will be described according to a first embodiment, beginning at step 100 with a first flat sheet 14. It should be understood that the method can be applied to only a portion of the quarter. It should be further understood that the method is not limited to a quarter 10, but can also be applied to other portions of the skate boot, such as the tongue or the vamp. The sheet 14 comprises a thermoplastic material, such as a thermoplastic ionomer resin (e.g. Surlyn™ 1601-2 or Surlyn™ 8940—Surlyn is a trademark of E. I. duPont de Nemours and Company) or thermoplastic polyurethane (TPU). The sheet 14 is preferably about 0.2 mm thick, though it should be understood that the thickness may vary according to the particular application and the structural properties desired for the assembled skate boot 12. The sheet 14 is preferably either entirely transparent or translucent, and may be colorless or tinted with a desired color, for reasons that will be discussed in detail below. The process continues at step 105.

At step 105, a graphic element 20 is printed on a first side 16 of the sheet 14, using an appropriate ink or dye that will adhere to the selected thermoplastic material. For example, if the sheet 14 is composed of TPU, a polyurethane based ink could be used. The graphic element 20 may be printed on the sheet 14 by any suitable method known in the art. It should be understood that the graphic element 20 may be any arrangement of one or more colors chosen to give the skate boot 12 an aesthetically pleasing appearance, and may include one or more words, one or more geometric shapes, a brand name, company logo or trademark. The graphic element 20 is dimensioned and positioned on the sheet 14 relative to the pattern 22 (shown in dashed lines), which represents the outline of the skate quarter 10 that will later be cut out from the sheet 14 and incorporated into the skate boot 12, to ensure that the graphic element 20 will appear in the desired location on the assembled skate boot 12. The pattern 22 may correspond to a left quarter or a right quarter of the skate boot 12, or both, or of a unitary quarter (as shown in FIG. 4) that extends on both the left and right sides of the skate boot 12. The graphic element 20 may optionally be an opaque graphical element covering only one or more parts 28 of the pattern 22, in which case only the parts 30 of the pattern 22 not covered by the graphic element 20 retain the transparent or translucent appearance of the sheet 14. The process continues at step 110.

At step 110, a second flat sheet 24 of thermoplastic material is laminated onto the first side 16 of the first sheet 14, such that the graphic element 20 is disposed between the sheets 14, 24, to produce a graphics sub-laminate 32. The lamination process is believed to be well known, and will not be discussed in detail. The second sheet 24 is preferably made of the same or similar thermoplastic material as the first sheet 14, and is of the same or similar dimensions, to ensure that the second sheet 24 properly adheres to both the printed parts 28 and the unprinted parts 30 of the first sheet 14 over at least the entire surface of the pattern 22. The second sheet 24 may be colorless or tinted with a desired color, and is preferably either entirely transparent or translucent, for reasons that will be discussed in detail below. The process continues at step 115. It is contemplated that step 110 may be omitted, in which case the graphics sub-laminate 32 would consist of only the first sheet 14 and the graphic element 20, and the process would proceed from step 105 directly to step 115.

At step 115, the graphics sub-laminate 32 is laminated onto a base layer 34 in a known manner, such that the second side 18 of the first sheet 14 adheres to the base layer 34 to form a graphical element laminate 26. The base layer 34 is preferably a flat sheet of fabric, such as a woven cloth containing natural fibers or synthetic fibers such as glass fiber, polyester, or carbon fiber, or any suitable woven or non-woven composite. The base layer 34 may alternatively be or contain any other suitable material, such as a paper or film with a design element printed thereon. The process continues at step 120.

At step 120, the graphical element laminate 26 is laminated to a skate boot quarter core 36 to form a skate quarter blank 46. The skate boot quarter core 36 may be composed of several layers 38, 40, 42, 44, depending on the intended application and the structural properties desired. In the embodiment shown, the skate boot quarter core 36 includes a layer 38 of foam such as expanded polypropylene compressed between an inner reinforcement layer 40 and an outer reinforcement layer 42. The reinforcement layers 40, 42 may be made of any suitable material, for example a composite non-woven polyester sheet such as KP, available from KangPao Industrial Co. in China, or Formo™ (a trademark of Texon International). It is contemplated that the inner reinforcement layer 40 may optionally be omitted, in which case only the outer reinforcement layer 42 would be used. The skate core also preferably includes an outer layer 44 composed of a suitable thermoplastic material, preferably Surlyn or polyurethane having a thickness of 0.25-1.1 mm, onto which the graphical element laminate 26 is laminated. It should be understood that a number of 5 suitable alternative compositions are known for the skate boot quarter core 36, and all are considered to be within the scope of the invention. The process continues at step 125.

At step 125, the skate quarter blank 46 is cut along the contour of the pattern 22, for example by using a die or other suitable cutting tool, and molded into the desired three-dimensional shape in a known manner, to form the skate quarter 10. The process continues at step 130.

At step 130, the skate quarter 10 is assembled into an ice skate 48. A skate boot 12 is formed by the addition of various known parts, which may include an insole (not shown), an outsole 52, a tongue 54, a toe protector 56, eyelets 58 and laces 60. It is contemplated that the assembly of the skate boot 12 may be done in any known manner, for example in the manner described in U.S. Pat. No. 7,451,991, the contents of which are incorporated by reference herein. It should be understood that, as a result of the positioning of the graphic element 20 relative to the pattern 22 at step 105, the graphic element 20 is properly aligned on the skate boot 12. The ice skate 48 is formed by fastening a blade holder 62 with a blade 64 to the outsole 52 in a known manner. It is contemplated that the skate boot 12 may alternatively be used in a roller skate (not shown), for example an inline roller skate, in which case a frame adapted to hold two or more wheels would be fastened to the outsole 52 instead of the blade holder 62 and blade 64. The process concludes at step 135.

Figure 2:
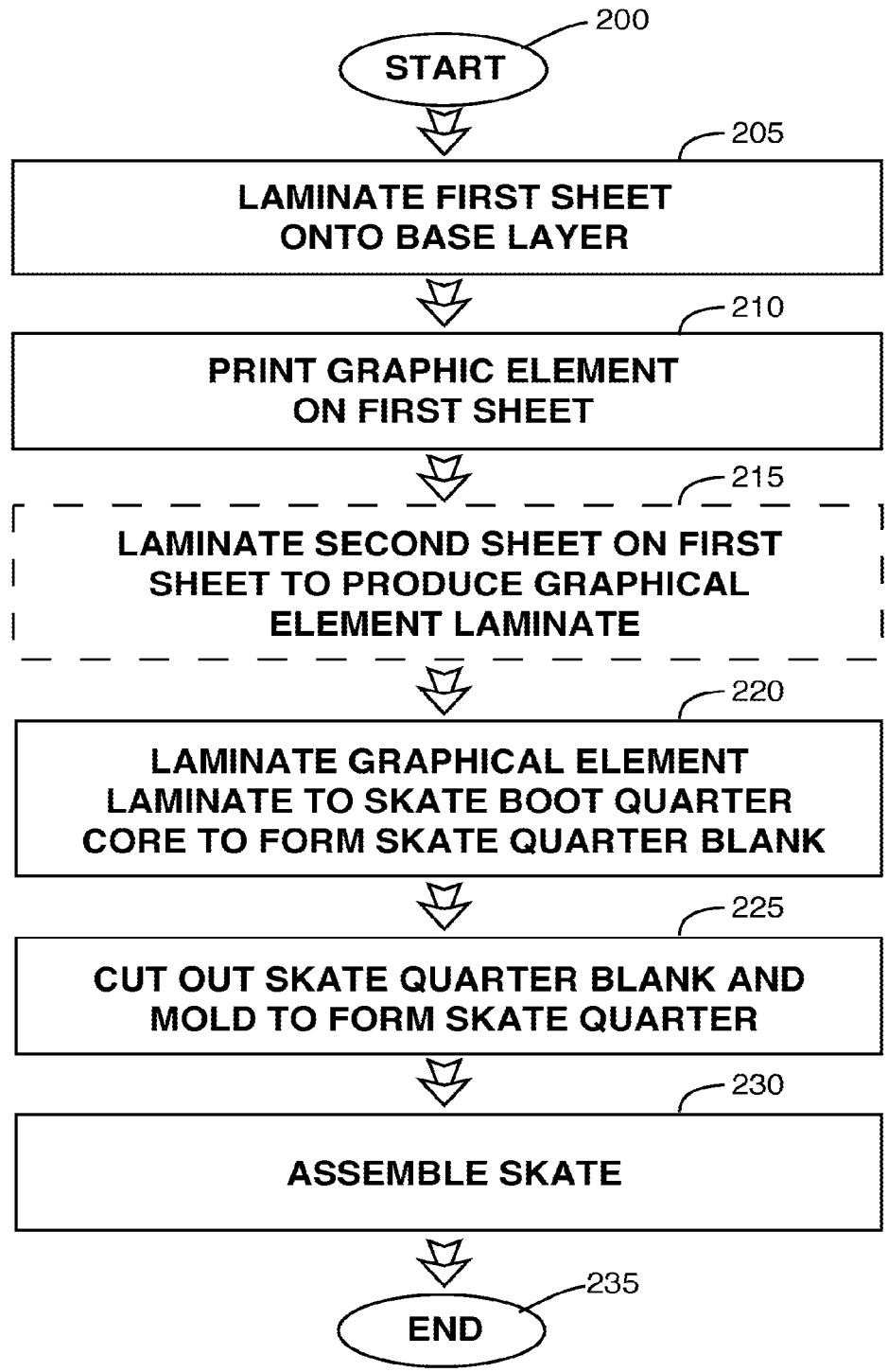
FIG. 2 is a logic diagram showing a method of manufacturing a skate according to a second embodiment.
Figure 5:
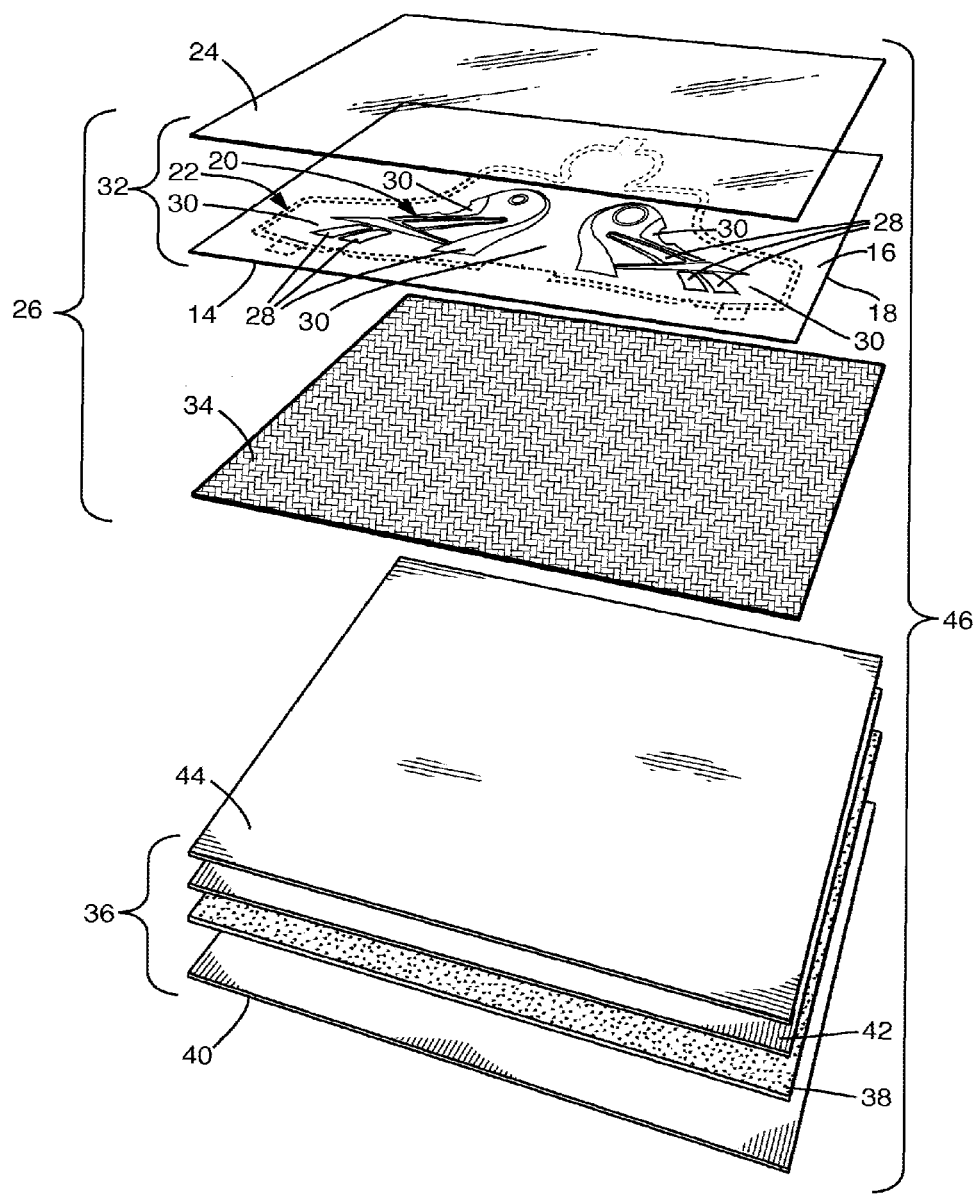
FIG. 5 is an exploded view showing the layers of material in a skate quarter according to an embodiment of the invention.

Referring to FIGS. 2 and 5, a method of assembly of a quarter 10 for a skate boot 12 (such as a skate boot 12 as shown in FIG. 4) will be described according to a second embodiment, beginning at step 200 with a base layer 34. The base layer 34 is preferably a flat sheet of fabric, such as a woven cloth containing natural fibers or synthetic fibers such as such as glass fiber, polyester, or carbon fiber, or any suitable woven or non-woven composite. The process continues at step 205.

At step 205, a first flat sheet 14 is laminated onto the base layer 34 in a known manner. The first flat sheet 14 comprises a suitable thermoplastic material, such as a thermoplastic ionomer resin or thermoplastic polyurethane (TPU). The sheet 14 is preferably about 0.2 mm thick, though it should be understood that the thickness may vary according to the particular application and the structural properties desired for the final skate boot 12. The first flat sheet 14 may be colorless or tinted with a desired color, and is preferably either transparent or translucent, for reasons that will be discussed in detail below. The process continues at step 210.

At step 210, a graphic element 20 is printed on the outwardly-facing side 16 of the first flat sheet 14, using an appropriate ink or dye that will adhere to the selected thermoplastic material. For example, if the sheet 14 is composed of TPU, a polyurethane based ink could be used. The graphic element 20 may be printed on the first flat sheet 14 by any suitable method known in the art. It should be understood that the graphic element 20 may be any arrangement of one or more colors chosen to give the skate boot 12 an aesthetically pleasing appearance, as will be discussed below in further detail. The graphic element 20 may additionally or alternatively include a brand name, company logo or trademark. The graphic element 20 is dimensioned and positioned on the sheet 14 relative to the pattern 22 (shown in dashed lines), which represents the outline of the skate quarter 10 that will later be cut out from the sheet 14 and incorporated into the skate boot 12. The pattern 22 may correspond to a left quarter or a right quarter of the skate boot 12, or both, or of a unitary quarter (as shown in FIG. 4) that extends on both the left and right sides of the skate boot 12. The graphic element 20 may optionally be an opaque graphical element covering only one or more parts 28 of the pattern 22, in which case only the parts 30 of the pattern 22 not covered by the graphic element 20 retain the transparent or translucent appearance of the sheet 14. The process continues at step 215.

At step 215, a second flat sheet 24 of thermoplastic material is laminated onto the side 16 of the first sheet 14 to produce a graphical element laminate 26. The lamination process is believed to be well understood, and will not be discussed in detail. The second sheet 24 is preferably made of the same or similar thermoplastic material as the first sheet 14, and is of the same or similar dimensions, to ensure that the second sheet 24 properly adheres to both the printed parts 28 and the unprinted parts of the first sheet 14 over at least the entire surface of the pattern 22. The second sheet 24 may be colorless or tinted with a desired color, and is preferably either transparent or translucent, for reasons that will be discussed in detail below. The process continues at step 220. It is contemplated that step 215 may be omitted, in which case the graphic element laminate 26 would consist of only the base layer 26, the first sheet 14 and the graphic element 20, and the process would proceed from step 210 directly to step 220.

Steps 220-235 are similar to steps 120-135, respectively, and as such they will not be described in detail.

Figure 3:
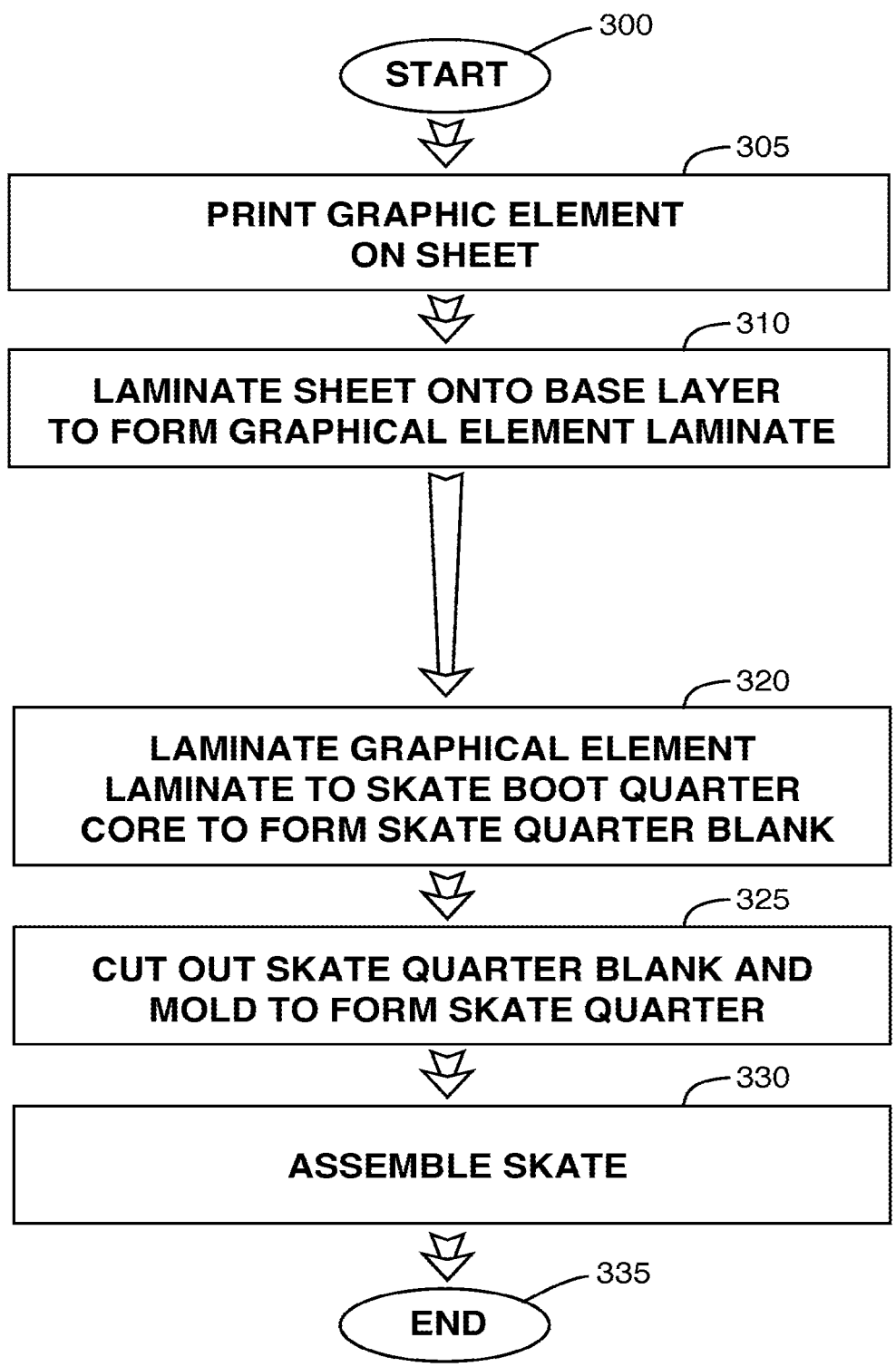
FIG. 3 is a logic diagram showing a method of manufacturing a skate according to a third embodiment.

Referring to FIGS. 3 and 5, a method of assembly of a quarter 10 for a skate boot 12 (such as a skate boot 12 as shown in FIG. 4) will be described according to a third embodiment, beginning at step 300 with a flat sheet 14. The sheet 14 comprises a thermoplastic material, such as a thermoplastic ionomer resin or thermoplastic polyurethane (TPU). The sheet 14 is preferably about 0.2 mm thick, though it should be understood that the thickness may vary according to the particular application and the structural properties desired for the assembled skate boot 12. The sheet 14 may be colorless or tinted with a desired color, and is preferably either entirely transparent or translucent, for reasons that will be discussed in detail below. The process continues at step 305.

At step 305, a graphic element 20 is printed on a side 18 of the sheet 14, using an appropriate ink or dye that will adhere to the selected thermoplastic material. For example, if the sheet 14 is composed of TPU, a polyurethane based ink could be used; if the sheet 14 is composed of Surlyn, a Surlyn based ink could be used. The graphic element 20 may be printed on the sheet 14 by any suitable method known in the art. It should be understood that the graphic element 20 may be any arrangement of one or more colors chosen to give the skate boot 12 an aesthetically pleasing appearance, as will be discussed below in further detail. The graphic element may additionally or alternatively include a brand name, company logo or trademark. The graphic element 20 is dimensioned and positioned on the sheet 14 relative to the pattern 22 (shown in dashed lines), which represents the outline of the skate quarter 10 that will later be cut out from the sheet 14 and incorporated into the skate boot 12. The pattern 22 may correspond to a left quarter or a right quarter of the skate boot 12, or both, or of a unitary quarter (as shown in FIG. 4) that extends on both the left and right sides of the skate boot 12. The graphical element 20 may optionally be an opaque graphical element covering only one or more parts 28 of the pattern 22, in which case only the parts 30 of the pattern 22 not covered by the graphic element 20 retain the transparent or translucent appearance of the sheet 14. The process continues at step 310.

At step 310, the printed side 18 of the sheet 14 is laminated onto a base layer 34 in a known manner, such that the side 18 of the sheet 14 adheres to the base 34 to form a graphical element laminate 26. The base layer 34 is preferably a flat sheet of fabric, such as a woven cloth containing natural fibers or synthetic fibers such as such as glass fiber, polyester, or carbon fiber, or any suitable woven or non-woven composite. The process continues at step 320.

Steps 320-335 are similar to steps 120-135, respectively, and as such they will not be described in detail.

Figure 6:
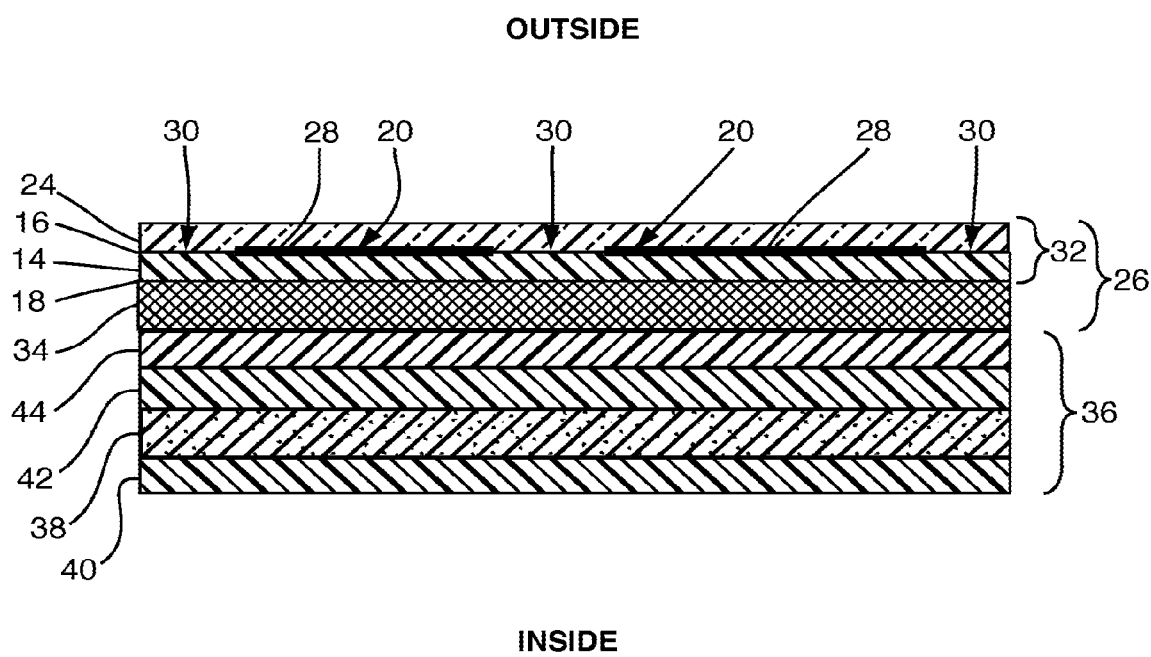
FIG. 6 is a cross-sectional view of the skate quarter of FIG. 5.

Referring to FIG. 6, the outermost layers of the quarter 10, from the skate boot quarter core 36 to the exterior of the skate boot 12 (such as a skate boot 12 as shown in FIG. 4), consist of the base layer 34, the sheet 14 with the graphic element 20 printed thereon, and optionally the sheet 24 such as in the embodiment shown in FIG. 6.

Referring to FIG. 4, it should be understood that the quarter 10 of the skate boot 12 can conveniently be provided with an attractive juxtaposition of parts 28 where the printed design is visible and parts 30 where the base layer 34 is visible through the unprinted portions of the transparent or translucent sheets 14, 24. As a result, the parts 30 can be numerous or intricately shaped by simply printing the desired shapes on the flat surface of the sheet 14, without the need to assemble the correspondingly numerous or complex composite inserts. In this manner, a complex design of the skate boot 12 does not result in greatly increased time, cost or effort required to assemble the skate boot 12. The possibility of tinting or shading the sheets 14, 24 allows an additional way to enhance the aesthetic appeal of the skate boot 12 without increasing manufacturing costs. In addition, if a different appearance is desired, the persons who assemble the skate would not generally require additional training to learn the proper placement of the inserts corresponding to the new design, likely resulting in further cost saving and providing a greater incentive to create new attractive skate boot designs. In addition, if desired the second sheet 24 can advantageously be given a glossy appearance. In addition, the second sheet 24 may be either smooth or embossed with a texture or pattern.

It should be understood that the methods described above allow for the production of a skate boot 12 having a customized appearance in a cost-efficient manner. In further variations of the methods described above, a database is provided, for containing at least one information record corresponding to at least one customized boot design. A customer can thereby be given the option to personalize the appearance of his skate boot 12, by either selecting one of a number of pre-existing designs from the database, combining pre-existing design components from the database to form an original design, or providing his own design to the database in a suitable digital format. A selected customized graphic element 20 corresponding to the customer's desired design is retrieved from the database and printed on the sheet 14 or 24 at step 105, 210, or 305 (as the case may be), preferably using a method of digital printing such as ink jet or laser printing, to create the customized skate boot 12.

Referring to FIGS. 4, 5 and 6, it should also be understood that the skate boot 12 is reasonably durable and resistant to wear and damage. The transparent 20 or translucent layers 14, 24 allow portions of the composite base layer 34 to be visible without being exposed to the environment. The layers 14, 24 protect the base layer 34 from some types of damage that may ordinarily occur during use of the skate 48, for example due to the impact of pucks, sticks and other skates if the skate 48 is used for playing ice hockey. In addition, the absence of composite inserts eliminates the possibility that seams or joints between design components could become frayed or damaged. The second sheet 24 additionally serves to protect the graphic element 20 from becoming damaged due to chipping or abrasion during use of the skate 48.

Referring to FIGS. 5 and 6, it should also be understood that if two thermoplastic sheets 14 and 24 are used (such as in the embodiment shown in those FIGS. 5 and 6), the layers of material in the quarter 10 can advantageously be ordered in a way that ensures reliable adhesion between successive layers. In particular, the graphic element 20 can be placed between the two sheets 14, 24 of the thermoplastic material to which it is designed to adhere, and the sheet 14 of thermoplastic material can be placed between the sheet 24, preferably made of the same or a similar thermoplastic material, and the base layer 34. As a result, the skate boot 12 is relatively convenient and inexpensive to manufacture, the quality of the final product is consistent, and the costs of scrap due to manufacturing defects are generally reduced.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A skate boot having a boot body with at least one portion of the boot body comprising:
    a core including an outer layer having a core outer side; and
    a graphical laminate including:
        a base fabric layer having a base layer inner side laminated on the core outer side and a base layer outer side opposite the base layer inner side,
        a first thermoplastic layer laminated on the base layer outer side, the first thermoplastic layer having a first thermoplastic layer inner side and a first thermoplastic layer outer side opposite the first thermoplastic layer inner side,
        a second thermoplastic layer laminated on the first thermoplastic outer side, the second thermoplastic layer having a second thermoplastic layer inner side and a second thermoplastic layer outer side opposite the second thermoplastic layer inner side, and
        a graphical element printed on at least one portion of at least one of the first thermoplastic layer outer side and the second thermoplastic layer inner side, at least a portion of the second thermoplastic layer being at least one of transparent and translucent such that when the laminate forms part of the skate boot at least a portion of the graphical element is visible through the second thermoplastic layer from an exterior of the skate boot.

2. The skate boot as recited in claim 1, wherein
    the base layer outer side includes a design element, and
    at least portions of the first thermoplastic layer and the second thermoplastic layer overlying the design element of the base layer are at least one of transparent and translucent such that when the laminate forms part of the skate boot at least a portion of the design element is visible through the first thermoplastic layer and the second thermoplastic layer from an exterior of the skate boot.

3. The skate boot as recited in claim 1, wherein one or both of the first thermoplastic layer and the second thermoplastic layer comprise a thermoplastic ionomer resin.

4. The skate boot as recited in claim 1, wherein one or both of the first thermoplastic layer and the second thermoplastic layer comprise a polyurethane.

5. The skate boot as recited in claim 1, wherein the first thermoplastic layer and the second thermoplastic layer each comprise at least one of a thermoplastic ionomer resin and a polyurethane.

6. The skate boot as recited in claim 2, wherein the first thermoplastic layer and the second thermoplastic layer each comprise at least one of a thermoplastic ionomer resin and polyurethane.

7. The skate boot as recited in claim 1, wherein the base layer comprises polyester.

8. The skate boot as recited in claim 1, wherein the base layer comprises glass fiber.

9. The skate boot as recited in claim 1, wherein the base layer comprises carbon fiber.

10. The skate boot as recited in claim 1, wherein the at least one portion of the boot body includes one or more of a quarter, a vamp and a tongue of the skate boot.

11. The skate boot as recited in claim 1, wherein the outer layer of the core is a thermoplastic layer.

12. The skate boot as recited in claim 11, wherein the core further includes at least one foam layer and at least one reinforcement layer in addition to the outer layer.

13. A graphical element laminate for use in forming a skate boot, the laminate comprising:
   a base layer having a base layer inner side and a base layer outer side opposite the base layer inner side, the base layer outer side including a design element;
   a first thermoplastic layer laminated on the base layer outer side, the first thermoplastic layer having a first thermoplastic layer inner side and a first thermoplastic layer outer side opposite the first thermoplastic layer inner side;
   a second thermoplastic layer laminated on the first thermoplastic outer side, the second thermoplastic layer having a second thermoplastic layer inner side and a second thermoplastic layer outer side opposite the second thermoplastic layer inner side; and
   a graphical element printed on at least one portion of at least one of the first thermoplastic layer outer side and the second thermoplastic layer inner side, at least a portion of the second thermoplastic layer being at least one of transparent and translucent such that when the laminate forms part of the skate boot at least a portion of the graphical element is visible through the second thermoplastic layer from an exterior of the skate boot;
   wherein at least portions of the first thermoplastic layer and the second thermoplastic layer overlying the design element of the base layer are at least one of transparent and translucent such that when the laminate forms part of the skate boot at least a portion of the design element is visible through the first thermoplastic layer and the second thermoplastic layer from an exterior of the skate boot.

14. The graphical element laminate as recited in claim 13, wherein the first thermoplastic layer and the second thermoplastic layer each comprise at least one of a thermoplastic ionomer resin and polyurethane.

15. The graphical element laminate as recited in claim 13, wherein the base layer is selected from the group consisting of polyester, glass fiber, carbon fiber and combinations thereof.

16. The graphical element laminate as recited in claim 13, wherein the base layer comprises a woven material and the design element is a weave of the material.

17. The graphical element laminate as recited in claim 16, wherein the base layer is selected from the group consisting of polyester, glass fiber, carbon fiber and combinations thereof.

18. A skate boot including a graphical element laminate as recited in claim 13.

19. The skate boot as recited in claim 18, wherein the inner side of the base layer is affixed to one or more of a quarter, a vamp and a tongue of the skate boot.

20. The skate boot as recited in claim 18, wherein the skate boot core includes at least one foam layer, at least one reinforcement layer, and an outer layer defining an outer surface, the base layer being affixed to the outer surface.

* * * * *